July 7, 1964 R. J. ROMAN 3,140,027
PHOTOGRAPHIC PROJECTOR DRIVE CONTROL MECHANISM
Filed Nov. 6, 1961 4 Sheets-Sheet 1

Robert J. Roman
INVENTOR.

BY
ATTORNEYS

July 7, 1964  R. J. ROMAN  3,140,027
PHOTOGRAPHIC PROJECTOR DRIVE CONTROL MECHANISM
Filed Nov. 6, 1961  4 Sheets-Sheet 2

Robert J. Roman
INVENTOR.

BY R. Frank Smith
Steve W. Gremban
ATTORNEYS

July 7, 1964 R. J. ROMAN 3,140,027
PHOTOGRAPHIC PROJECTOR DRIVE CONTROL MECHANISM
Filed Nov. 6, 1961 4 Sheets-Sheet 3
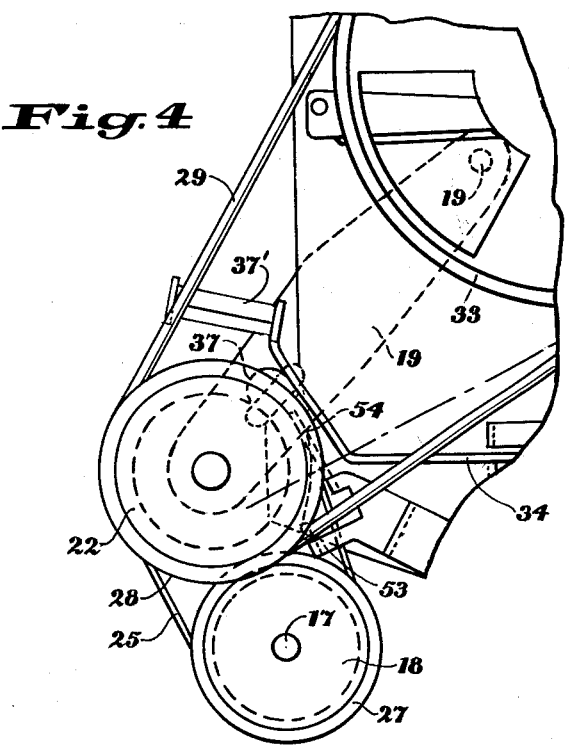
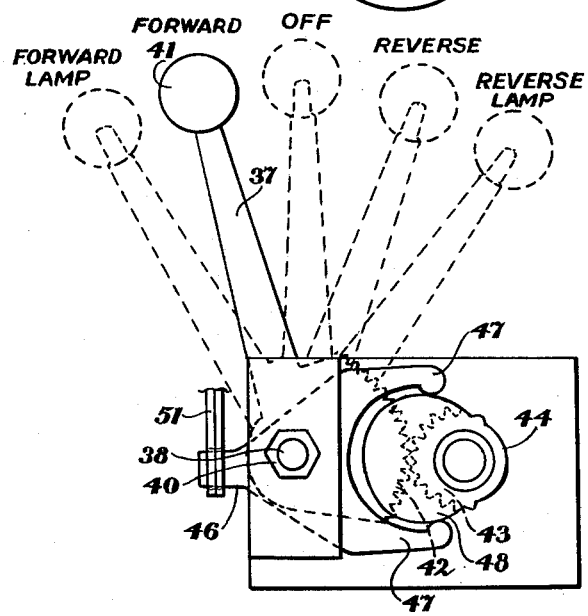
Robert J. Roman
INVENTOR.
BY R. Frank Smith
Steve W. Grenban
ATTORNEYS Robert J. Roman
INVENTOR.

BY R. Frank Smith
Steve W. Grumban
ATTORNEYS

United States Patent Office 3,140,027
Patented July 7, 1964

3,140,027
PHOTOGRAPHIC PROJECTOR DRIVE CONTROL
MECHANISM
Robert J. Roman, Rochester, N.Y., assignor to Eastman Kodak Company, Rochester, N.Y., a corporation of New Jersey
Filed Nov. 6, 1961, Ser. No. 150,326
6 Claims. (Cl. 226—46)

This invention relates generally to photography, and more specifically to a control mechanism for the drive of a projector.

The principal object of the present invention is to provide a drive control mechanism for a motion-picture projector or the like having a single control lever for the projector providing selectively an "off" position and a plurality of drive positions, movement of the lever to such drive positions simultaneously actuating, in an appropriate manner, switches for the drive motor and lamp.

Another object of the invention is to provide a control drive mechanism for a projector or the like that is of simple design and construction, thoroughly reliable and efficient in operation, and economical to manufacture.

A further object of this invention is to provide a drive motor control mechanism having an interlock associated therewith to prevent changing the speed of the projector while the control lever is in either the "off," "reverse" or "reverse lamp" positions.

A more specific object of the invention is the provision of a drive motor control mechanism for a projector or the like having a single pivotally movable control lever adapted by means of a gear to simultaneously control a switch and a cam, the cam in turn actuating another lever which controls a shiftable transmission.

Objects and advantages other than those set forth above will be apparent from the following description when read in connection with the accompanying drawings, in which:

FIG. 4 is a segmental view of a portion of the drive control mechanism of FIG. 1 showing the mechanism in a "reverse" position;

FIG. 5 is a view taken along line 5—5 of FIG. 2 looking in the direction of the arrows, and showing in dotted and full lines the five operating positions of the control device;

Figure 1:
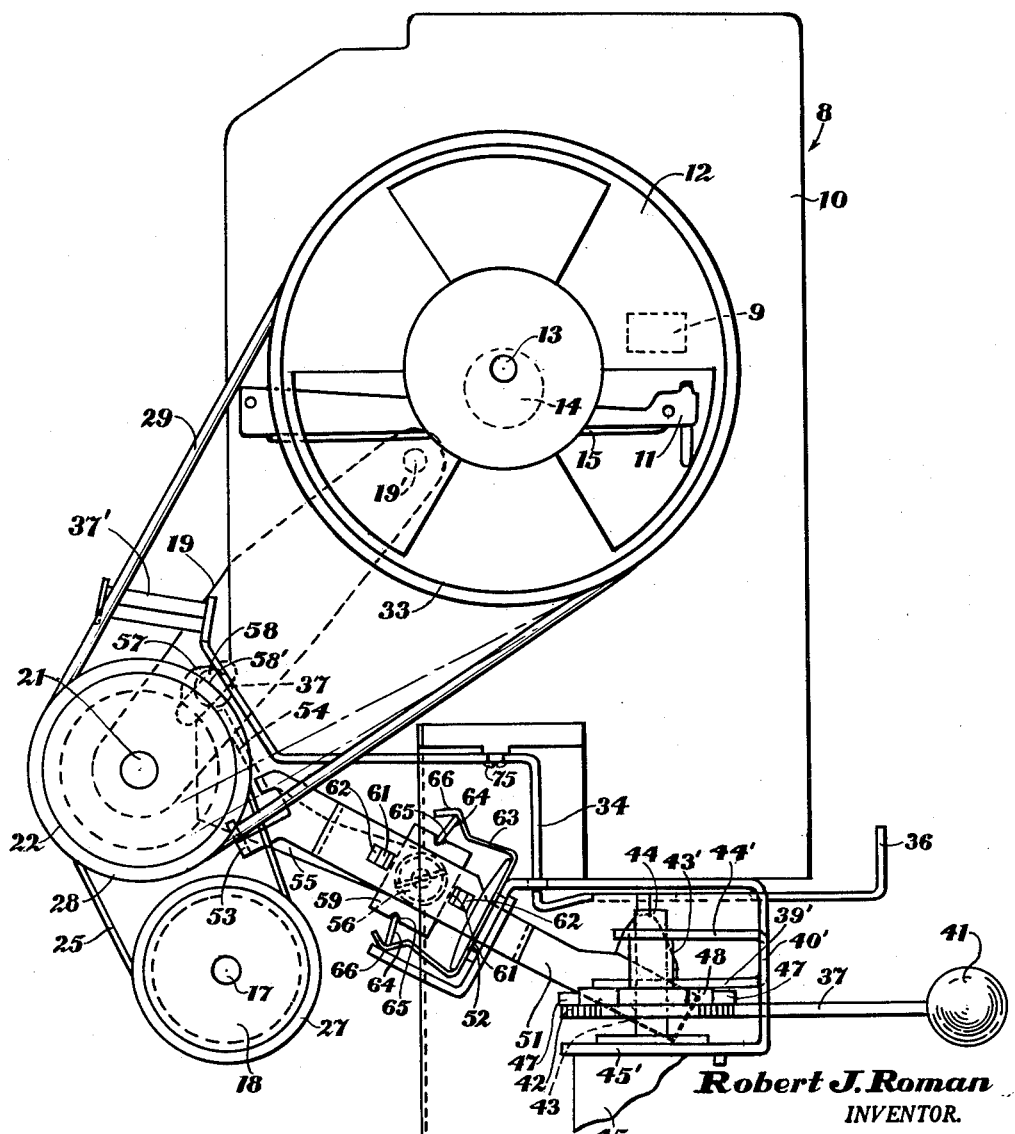
FIG. 1 is a side elevation view of a preferred embodiment of the drive motor control mechanism of this invention showing the mechanism in the "forward" position.

With reference to the drawings, a preferred embodiment of a drive motor control mechanism is disclosed in connection with a motion-picture projector 8, only a portion of which is shown. The projector 8 is of a conventional type having an aperture 9, shown dotted, through which a light beam is projected, and a pulldown mechanism 11 for intermittently transporting a film strip, not shown, one frame at a time past aperture 9. A circular shutter blade 12 is secured to a shaft 13 rotatably mounted in a frame 10 of projector 8, and a cam 14, shown dotted, mounted on shaft 13 co-operates with a lip 15 on pulldown mechanism 11 to impart pivotal up-and-down and lateral in-and-out movements to a film claw forming a part thereof to intermittently advance the film as is well known in the art. The shutter blade 12, when rotated in one direction, causes pulldown mechanism 11 to transport the filmstrip in one direction, and when rotated in the opposite direction, causes pulldown mechanism 11 to transport the filmstrip in the oppoiste direction.

Figure 2:
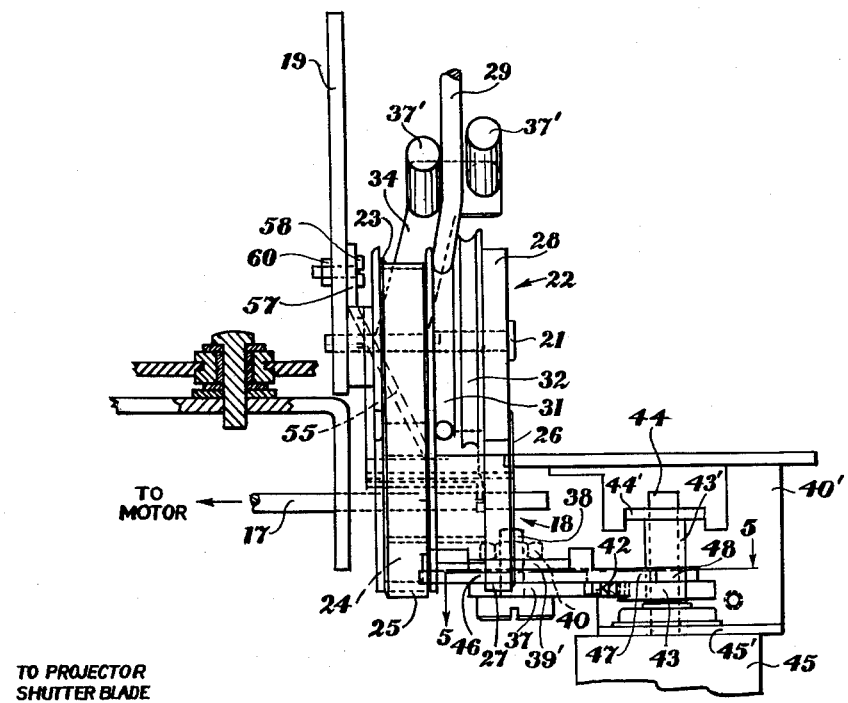
FIG. 2 is a segmental front elevational view of the drive control mechanism of FIG. 1.
Figure 3:
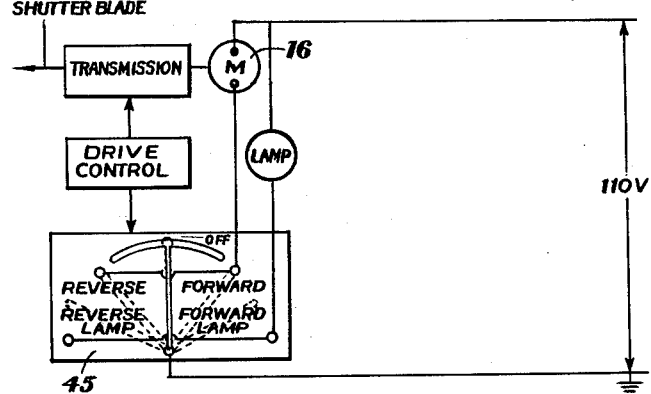
FIG. 3 is a combined schematic block and electrical circuit diagram of the invention.
Figure 6:
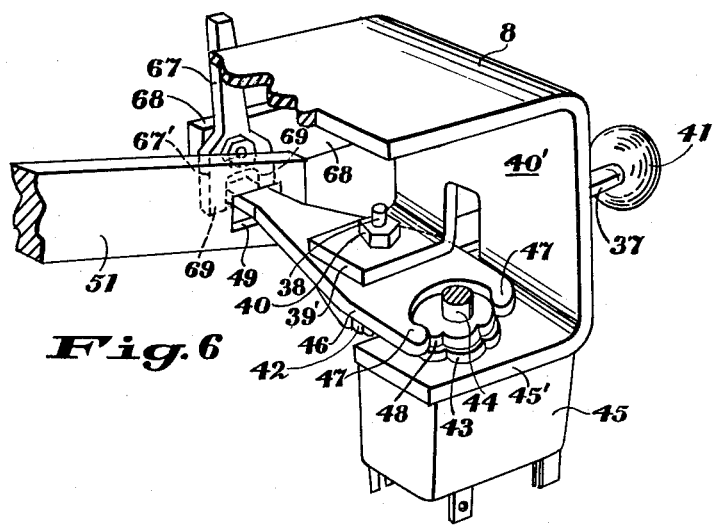
FIG. 6 is a segmental view in perspective of the drive control mechanism showing the control lever in the "off" position.
Figure 7:
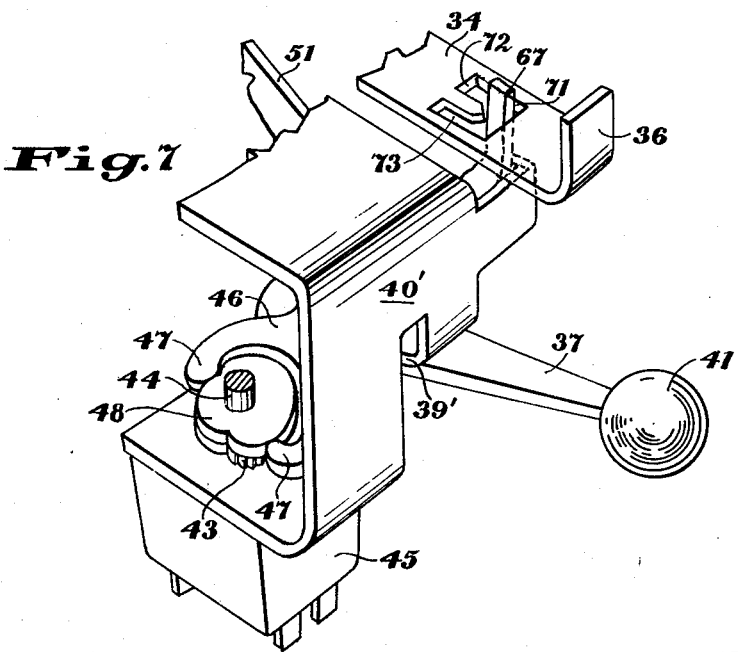
FIG. 7 is a view similar to FIG. 6 but taken at a different angle showing the control lever in a "forward" position.

The drive mechanism for shutter blade 12 and shaft 13 comprises a unidirectional electric motor 16, as seen schematically in FIG. 3, having a drive shaft 17, see FIG. 2, upon which a drive pulley 18 is mounted. A shiftable transmission for transmitting the power from motor 16 and drive pulley 18 to shutter blade 12 and shaft 13, seen best in FIG. 1, comprises an arm 19 pivotally mounted at 19' to projector frame 10. A stub shaft 21 is secured to one end of arm 19 and laterally extends therefrom with its axis parallel to the axis of drive shaft 17. A driven pulley 22 is rotatably mounted on shaft 21 and has a first groove 23, see FIG. 2, in register with a grove 24 of drive pulley 18, the groves 23, 24 being interconnected by an endless belt 25. The drive pulley 18 further has a circular disk 26 having a rubber tire 27 or other frictional material mounted on its periphery in alignment with a cylindrical portion 28 of drive pulley 22. The transmission, including arm 19 and pulley 22, is shiftable into neutral, forward drive and reverse drive positions by the drive control mechanism which is to be explained hereinafter. In a "forward" postion of the drive control mechanism, the transmission is moved into its forward drive position in which drive pulley 18 is drivingly connected to driven pulley 22 by belt 25 as seen in FIG. 1, and upon operation drives shutter blade 12 and shaft 13 in one direction transporting the filmstrip in a forward direction for projection. In an "off" position of the drive control mechanism, the transmission is shifted into its neutral position in which belt 25 is loose, and rubber tire 27 is out of engagement with cylindrical portion 28 so that drive pulley 18 does not impart any movement to driven pulley 22, which remains stationary. In a "reverse" position of the drive control mechanism, the transmission is shifted into its reverse drive position in which belt 25 is loose, and cylindrical portion 28 is moved into engagement with rubber tire 27 as seen in FIG. 4, and driven pulley 22 is driven directly by rubber tire 27 and in the opposite direction to which driven pulley 22 was driven by belt 25. Consequently, the shutter blade 12 and shaft 13 are driven in the opposite direction. The driven pulley 22 drives shutter blade 12 and shaft 13 by means of an endless belt 29 adapted to selectively connect one of two grooves 31, 32 (FIG. 2) of different diameters in driven pulley 22 to a peripheral groove 33 in shutter blade 12. When belt 29 is in the smaller-diameter groove 31, shutter blade 12 and shaft 13 are rotated at a predetermined angular velocity to provide the proper transport speed for silent movies (e.g. 16 frames per second). When belt 29 is in the larger-diameter groove 32, blade 12 and shaft 13 are rotated at a higher angular velocity to provide the proper film transport speed for sound movies (e.g. 24 frames per second). The belt 29 is adapted to be selectively shifted by the aid of rotating pulley 22 into one or the other of grooves 31, 32 by a lever 34 pivoted at 75 and having a handle 36 at one end for manual manipulation by the operator, and spaced-apart projections 37' adjacent its opposite end between which belt 29 passes (see FIGS. 1 and 2). A detent, not shown, may be provided for releasably holding belt-shifting lever 34 in one or the other position.

The aforementioned drive control mechanism as best seen in FIGS. 1, 2 and 5–7 comprises a pivotal lever 37 mounted on a stud 38 secured to a tab 39' by a nut 40. Tab 39' laterally extends from a bracket 40' (FIG. 6) secured to frame 10 of projector 8. The lever 37 has a handle 41 at one end for manual manipulation by the operator, and a gear segment 42 at its opposite end in driving engagement with a gear segment 43 mounted on a sleeve 43' secured to a shaft 44 of a commercially available five-way switch 45. Switch 45 is secured to a flange 45' and one end of shaft 44 is journaled in a flange 44' struck out of bracket 40'. Another lever 46 is pivotally mounted on stud 38, and has forked arms 47 at one end adapted to co-operate with the periphery of a cam 48 mounted on sleeve 43', adjacent gear segment 43. The opposite end of lever 46 extends through an opening 49 (FIG. 6) in one end of lever 51 which is mounted transverse to lever 46. Lever 51 extends through an opening in a flange 52 of bracket 40' as seen in FIG. 1, and the opposite end of lever 51 has a pair of guide arms 53, 54 between which belt 25 passes. Another lever 55 has one end secured to lever 51 by a screw 56, and its opposite end 57 secured to pivotal arm 19 by a screw 58 extending through an elongated slot 58' in arm 19, and having a nut 60 at its other end (see FIG. 2). A flat plate 59 is interposed between levers 51, 55 and has lugs 61 extending through openings 62 in lever 51 for positively mounting plate 59 in a fixed position. A U-shaped spring element 63 is secured to flange 52 by screws or the like, and a toggle plate 64 is interposed between a V-shaped notch 65 in each end of plate 59, and a V-shaped groove 66 in each leg of spring 63. The toggle plates 64 in combination with spring 63 form an overcenter spring toggle system adapted to urge lever 55, arm 19 and pulley 22 toward or away from drive pulley 18 depending upon the position of the overcenter spring toggle system. When spring toggle system urges driven pulley 22 away from drive pulley 18, it tends to tension drive belt 25 connecting the drive and driven pulleys 18, 22 respective, to assure a good driving relationship therebetween. When the overcenter spring toggle system urges driven pulley 22 toward drive pulley 18, the cylindrical portion 28 of driven pulley 22 is moved into engagement with rubber tire 27 to assure a good driving relationship.

As indicated earlier, switch 45 is movable by lever 37 into five positions as seen best in FIGS. 3 and 5. The center position is an "off" position, the first positions on either side of the "off" position complete the electrical circuit to the unidirectional drive motor and shift the transmission for "forward" and "reverse" operation, and the last two positions on either side of the first positions connect the electrical circuit to both the drive motor and the projector lamp for "forward" and "reverse" operation with the lamp on without further effecting the transmission setting.

An interlock mechanism is interposed between lever 46 of the drive control mechanism and belt shifting lever 34 to positively prevent belt 29 from being shifted when control lever 37 is in the "off," "reverse" or "reverse lamp" positions. In the "off" position, pulley 22 is not rotating and hence it is impossible to shift belt 29. In the "reverse" positions, two different projection speeds are not needed. The interlock mechanism comprises a lever 67 (see FIGS. 6 and 7) pivotally mounted at 67' on a flange 68 of bracket 40', the lever 67 further having spaced apart projections 69 at one end between which one end of lever 46 extends. The opposite end of lever 67 extends through a U-shaped slot 71 in shifting lever 34, and in the "off," "reverse" and "reverse lamp" positions, the lever 67 will be disposed in one or the other of the legs 72, 73 of slot 71 and hence obviously prevent lateral movement of belt shifting lever 34. In the remaining positions, namely "forward" and "forward lamp" of control lever 37, lever 67 will be pivoted from legs 72, 73 of slot 71, and belt shifting lever 34 may be pivoted laterally to shift belt 29 (see FIG. 7). The cam 48 is so shaped that in the "off" position, the lever 55, arm 19 and driven pulley 22 assume a neutral position in which driven pulley 22 is drivingly disconnected from drive pulley 18. When lever 37 is moved into either the "forward" or "reverse" positions, cam 48 pivots lever 46 which moves lever 51 causing the spring toggle system to be moved into one or the other of its over-center positions for moving driven pulley 22 into respective belt driving and direct driving relationship with drive pulley 18 for transporting the filmstrip in one or the other of opposite directions. Note that in either drive position lever 51 is floating in the toggle system and does not contact lever 46. When control lever 37 is moved into either of the "forward lamp" or "reverse lamp" positions, the cam is so shaped that no further movement is imparted to lever 46.

In the operation of this invention, let us assume initially that control lever 37 is in the "off" position. In this position, switch 45 is in the "off" position and cam 48 which is in engagement with arms 47, holds the transmission in a neutral position in which belt 25 is loose and driven pulley 22 is out of driving engagement with drive pulley 18. In this position, the projector will not operate. Now, if the operator should move control lever 37 to the "forward" position, gear segment 42 turns gear segment 43 moving switch 45 into a position connecting the power source to drive motor 16 for driving drive pulley 18. At the same time, the cam 48 also shifts the transmission into a belt-connected forward drive relation as seen in FIG. 1 driving shutter blade 12 and pulldown mechanism 11 in a direction for transporting the film through projector 8 in the forward direction for normal projection. Moving lever 37 to the "forward lamp" position as seen in FIGS. 3 and 5 causes gear segment 42 to turn gear segment 43 and switch 45 connecting the power supply to both the drive motor 16 and a projector lamp. The cam 48, however, continues to hold the transmission in its forward drive position. The same general principle of operation is achieved upon moving control lever 37 to the "reverse" or "reverse lamp" positions, except that the spring toggle system is moved into a different overcenter position shifting the transmission into a reverse drive position as seen in FIG. 4.

The invention has been described in detail with particular reference to a preferred embodiment thereof but it will be understood that variations and modifications can be effected within the spirit and scope of the invention as described hereinabove, and as defined in the appended claims.

I claim:

1. In a motion-picture projector, the combination comprising: a film-advancing mechanism; a drive means including a unidirectional electric motor; a shiftable transmission for selectively connecting and disconnecting said film-advancing mechanism to said drive means, said transmission being shiftable between a neutral position and a drive position; means for changing the speed at which said film-advancing mechanism is driven between two different speeds; switch means controlling the energization of said motor; means interconnecting said transmission means and said switch means for simultaneously controlling the two; and means interlocking said interconnecting means and said speed changing means to prevent operation of said speed changing means when said transmission is in said neutral position.

2. In a motion-picture projector, the combination comprising: a film-advancing mechanism; a drive means including a unidirectional electric motor; a shiftable transmission for selectively connecting and disconnecting said film-advancing mechanism to said drive means, said transmission being shiftable from a neutral position to forward and reverse drive positions; means for changing the speed at which said film advancing mechanism is driven between two different speeds; switch means connecting the energization of said motor; means interconnecting said transmission means and said switch means for simultaneously controlling the two; and means interlocking said interconnecting means and said speed changing means to prevent operation of said speed changing means when said transmission means is in said neutral and reverse drive positions.

3. The invention according to claim 2 wherein said interconnecting means comprises a first pivotal lever, gear means interconnecting said lever to said switch means, and a cam moved by said gear and connected to said transmission for shifting the same.

4. The invention according to claim 3 wherein said gear means comprises a gear segment at one end of said lever in meshing engagement with a gear segment carried by said switch means, and a second pivotal lever having a cam follower at one end and its opposite end connected to said transmission.

5. The invention according to claim 2 wherein said interlocking means comprises an arm movable by said interconnecting means into a slot in said speed changing means.

6. The invention according to claim 5 wherein said arm is pivotally mounted, and one end thereof has a pair of spaced-apart projections between which a lever of said interconnecting means extends for moving same causing the opposite end of said arm to move into and out of said slot.

References Cited in the file of this patent

UNITED STATES PATENTS

| | | |
|---|---|---|
| 2,911,849 | Mitchell et al. | Nov. 10, 1959 |
| 2,986,318 | Tiger | May 30, 1961 |
| 3,018,976 | Nemeth | Jan. 30, 1962 |
| 3,096,682 | Moore | July 9, 1963 |